(12) United States Patent
Kert et al.

(10) Patent No.: US 9,172,908 B2
(45) Date of Patent: Oct. 27, 2015

(54) UNPAIRED DEVICES (71) Applicant: Microsoft Corporation, Redmond, WA (US)

(72) Inventors: Kaido Kert, San Francisco, CA (US); Christopher James Foulds, Cambridgeshire (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 101 days.

(21) Appl. No.: 13/921,096

(22) Filed: Jun. 18, 2013

(65) Prior Publication Data
US 2014/0368603 A1  Dec. 18, 2014

(51) Int. Cl.
*H04N 7/15* (2006.01)
*H04B 11/00* (2006.01)
*H04L 12/28* (2006.01)
*H04N 21/436* (2011.01)
*H04N 21/4363* (2011.01)
*H04N 21/6547* (2011.01)
*H04N 21/658* (2011.01)
*H04W 76/02* (2009.01)

(52) U.S. Cl.
CPC .......... *H04N 7/15* (2013.01); *H04B 11/00* (2013.01); *H04L 12/2809* (2013.01); *H04L 12/2823* (2013.01); *H04N 21/43615* (2013.01); *H04N 21/43637* (2013.01); *H04N 21/6547* (2013.01); *H04N 21/6581* (2013.01); *H04L 2012/2841* (2013.01); *H04L 2012/2849* (2013.01); *H04W 76/02* (2013.01)

(58) Field of Classification Search
CPC  H04M 3/42042; H04M 1/575; H04M 1/7253
USPC .............. 348/14.01–14.16; 725/113; 455/415
See application file for complete search history.

(56) References Cited

U.S. PATENT DOCUMENTS 6,339,706 B1   1/2002  Tillgren et al.
8,368,737 B2   2/2013  Ravi et al.
(Continued)

FOREIGN PATENT DOCUMENTS

EP   1786145   5/2007
EP   2306692   4/2011
EP   2587799   5/2013

OTHER PUBLICATIONS

"X1slim User's Manual", Retrieved at < http://chatterboxusa.com/wp-content/uploads/2011/10/manual-X1slim-by-page-number-.pdf>>, Oct. 2011, pp. 10.
(Continued)

*Primary Examiner* — Melur Ramakrishnaiah
(74) *Attorney, Agent, or Firm* — Danielle Johnston-Holmes; Micky Minhas (57) ABSTRACT Disclosed is a user device comprising an output component configured to deliver an experience to a user in a standalone mode of the user device and an input component configured to receive a notification of an event. The device also comprises an indication generator for generating an indication for transmission over an air interface in response to receiving the input. The indication comprises an identifier relating to the event. Further, the device comprises a processing component configured to receive a message from a network node via a network. The message indicates that a media device has detected the identifier, and also comprises information of the media device. The processing component is configured to process the message received from the network to enable transfer of at least part of the experience to the media device.

32 Claims, 4 Drawing Sheets

(56) References Cited

U.S. PATENT DOCUMENTS

| | | | |
|---|---|---|---|
| 2007/0245384 A1* | 10/2007 | Walter et al. | 725/62 |
| 2009/0034704 A1* | 2/2009 | Ashbrook et al. | 379/142.04 |
| 2009/0251526 A1 | 10/2009 | Book | |
| 2010/0110837 A1 | 5/2010 | Jung et al. | |
| 2012/0245722 A1 | 9/2012 | Yamamura | |
| 2014/0112463 A1* | 4/2014 | Ghesquiere et al. | 379/142.04 |
| 2014/0181886 A1* | 6/2014 | Goodman et al. | 725/133 |

OTHER PUBLICATIONS

"BlackBerry Visor Mount Speakerphone VM-605", Retrieved at <<http://docs.blackberry.com/en/smartphone_users/deliverables/8344/BlackBerry_Visor_Mount_Speakerphone_VM-605-1.0-US.pdf>>, Feb. 15, 2010, pp. 15.

"Wi-Fi Certified Miracast", Retrieved at <<http://www.wi-fi.org/wi-fi-certified-miracast%E2%84%A2>>, Sep. 23, 2012, p. 1.

Kim, Ryan, "Multi-screen Mania: How our Devices Work Together", Retrieved at <<http://gigaom.com/2012/08/29/multi-screen-mania-how-our-devices-work-together/>>, Aug. 29, 2012, pp. 7.

Allen, Gary., "Companion Devices' Are Only Part of Immersive Video Environment", Retrieved at <<http://www.tvtechnology.com/multiscreen-views/0180/%E2%80%98companion-devices-are-only-part-of-immersive-video-environment-/217705>>, Feb. 12, 2013, pp. 3.

"International Search Report and Written Opinion", Application No. PCT/US2014/042215, Sep. 26, 2014, 16 pages.

"International Preliminary Report on Patentability", Application No. PCT/US2014/042215, Aug. 5, 2015, 12 pages.

* cited by examiner

UNPAIRED DEVICES

BACKGROUND

Conventional communication systems allow the user of a device, such as a personal computer or mobile device, to conduct voice or video calls over a packet-based computer network such as the Internet. Such communication systems include voice or video over internet protocol (VoIP) systems. These systems are beneficial to the user as they are often of significantly lower cost than conventional fixed line or mobile cellular networks. This may particularly be the case for long-distance communication. To use a VoIP system, the user installs and executes client software on their device. The client software sets up the VoIP connections as well as providing other functions such as registration and authentication. In addition to voice communication, the client may also set up connections for other communication media such as instant messaging ("IM"), SMS messaging, file transfer and voicemail.

Recently, internet capabilities and functionality has been integrated into a television set (often referred to as a "Smart TV"), or into a set-top box arranged to be connected to a television set. This includes the integration of client software into a television set to enable communications over a packet-based computer network such as the Internet.

The embedding of a packet-based communication client in a TV has the advantage that a large screen is present, which can be utilised for video calling. Furthermore, significant processing power can be provided in the TV, particular as the power requirements for a large, mains electricity powered consumer electronics device are less stringent than, for example mobile devices. This enables a full range of features to be included in the embedded communication client, such as high quality voice and video encoding.

It is also known to integrate hardware devices into a Smart TV. For example, a microphone may be integrated into a smart TV which are capable of always listening to the environment of the Smart TV (for example a room of a house) to enable the Smart TV to react to voice commands.

SUMMARY

There is provided a user device comprising an output component configured to deliver an experience to a user in a standalone mode of the user device and an input component configured to receive a notification of an event. The device also comprises an indication generator for generating an indication for transmission over an air interface in response to receiving said input. The indication comprises an identifier relating to the event. Further, the device comprises a processing component configured to receive a message from a network node via a network. The message indicates that a media device has detected said identifier, and also comprises information of the media device. The processing component is also configured to process said message received from the network node and to provide a selectable option to a user of the user device via the output component. The selectable option is provided in dependence on said information of the media device. The processing component is configured to detect selection of the option by the user and to initiate a paired mode of the user device by transferring at least part of the experience to the media device.

There is also provided a media device comprising a detection component configured to directly detect an indication output from a user device over an air interface, said indication comprising an identifier relating to an event at the user device. The media device also comprises a processing component configured to decode the identifier in said indication and transmit a message to a network node via a network. The message indicates the presence of the media device to the network node. The processing component is also configured to initiate a paired mode of the media device to receive a transfer of at least part of an experience delivered at the user device to the media device. The media device further comprises an output component configured to deliver said at least part of the experience to a user of the media device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

For a better understanding of the described embodiments and to show how the same may be put into effect, reference will now be made, by way of example, to the following drawings in which.

DETAILED DESCRIPTION

Embodiments will now be described by way of example only.

Disclosed herein are techniques which enable a media device (e.g. TV) to listen for known audio tones, generated in response to an event, and detect invisible audio marks generated by a service provider that are played on secondary user devices (e.g. smart phones). Options are presented on how to interact with the event and device. Alternatively or additionally, the device may be to operable to watch for known visual indicators (e.g. QR codes), generated in response to an event.

The user device has an output component configured to deliver an experience to a user in a standalone mode of the user device. For instance, the user device may deliver a standalone experience version of a communication client to the user. At least a part of the experience can be transferred to the media device, so as to deliver a "companion app" style experience, by generating and transmitting an indication of an event.

The media device has an output component configured to deliver said at least part of the experience to the user. For instance, the media device may have an output component in the form of a large screen which is used to deliver a large-screen experience version of a communication client to the user.

Figure 1:
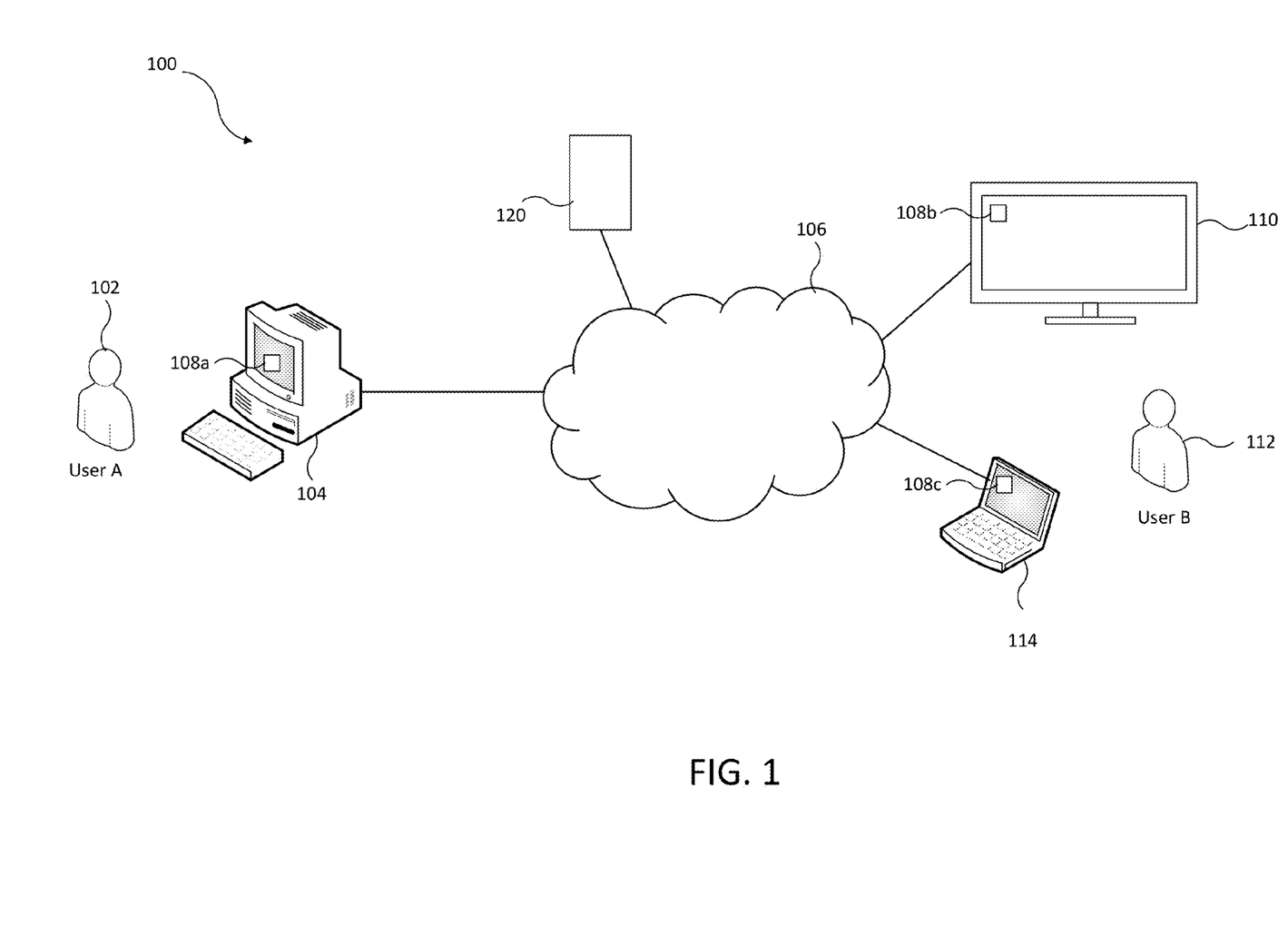
FIG. 1 shows a schematic illustration of a communication system.

FIG. 1 shows a communication system 100 comprising a second user 102 ("User A") who is associated with a second user device 104 and a first user 112 ("User B") who is in the vicinity of a media device 110, which is a television ("TV") 110 in this embodiment.

It is commonplace for there to be one or more other devices in the same environment as a TV. These other devices are referred to herein as "companion devices" for reasons which will be described in more detail below. For example in a living room companion devices such as smart phones and laptop computers may also be present. FIG. 1 illustrates such an example of a companion device as a laptop computer 114.

Whilst FIG. 1 shows a single companion user device 114 in addition to the TV 110, it will be appreciated that a plurality of companion devices may be present in the vicinity of the TV 110.

Often the presence of these devices is transient and the user would not want to make a permanent connection with the TV 110, nor would they want to log into the TV 110 in any traditional form.

Disclosed herein is a television which listens for audio events (identifications) on these other devices and which can pick up on unique temporary audio identifiers sent by a service provider to be injected into an audio stream played-out from one of these other devices. Once detected, the TV then signals to the service provider's backend what its capabilities are and what identifier it can hear.

The service operator's backend uses this to signal back to the original device that there is a large screen (TV) in vicinity and what it can do (i.e. the TV's capabilities).

Examples of this could be in a video call scenario where the TV would hear the audio watermark of a calling application. By signalling to the backend that it can hear this, the companion device can be prompted to give options to answer the call on the TV or if the call has already started to transfer the call to the TV. As this is a temporary event the connection is only present for the duration of the call.

Other examples would be the purposeful generation of a tone on a laptop to enable a temporary pairing between that laptop and a large screen to share a presentation.

The user device 104 can communicate over a network 106 in the communication system 100 with the companion user device 114 or the TV 110, thereby allowing the users 102 and 112 to communicate with each other over the network 106.

The communication system 100 shown in FIG. 1 is a packet-based communication system, but other types of communication system could be used. The network 106 may, for example, be the Internet. Each of the user devices 104 and 114 may be, for example, a mobile phone, a tablet, a laptop, a personal computer ("PC") (including, for example, Windows™, Mac OS™ and Linux™ PCs), a gaming device, a personal digital assistant ("PDA") or other embedded device able to connect to the network 106. The user devices 104 and companion device 114 are arranged to receive information from and output information to the user of the respective device. The user devices 104 and companion device 114 comprise output means such as a display and speakers. The user device 104 and companion device 114 also comprise input means such as a keypad, a touch-screen, mouse, a microphone for receiving audio signals and/or a camera for capturing images of a video signal. The user devices 104 and the companion device 114 are connected to the network 106. For a touch-screen, the user may input commands by way of swipes or gestures.

Note that in alternative embodiments, the user device 104 and companion device 114 can connect to the network 106 via additional intermediate networks not shown in FIG. 1. For example, if the user device 104 is a mobile device, then it can connect to the network 106 via a cellular mobile network, not shown in FIG. 1.

The user device 104, companion device 114, and the TV 110 each execute an instance of a communication client 108, provided by a software provider associated with the communication system 100. The communication client is a software program executed on a local processor in the respective device. The client performs the processing required at the device in order for the device to transmit and receive data over the communication system 100.

Communication system 100 also comprises a back-end server 120 associated with a service provider (e.g. an operator of network 106). Both device 114 and TV 110 are operable to communicate with back-end server 120 over network 106. Although shown as a single server, it will be appreciated that the functionality of server 120 may be divided between any number of suitable computing devices.

Each communication client 108a, 108b, 108c has a log in/registration facility which associates the user device 104, TV 110 and companion device with a particular respective user. Users can have communication client instances running on other devices associated with the same log in/registration details.

In the case where the same user, having a particular username, can be simultaneously logged in to multiple instances of the same client application on different terminals, back-end server 120 is arranged to map the username (user ID) to all of those multiple instances but also to map a separate sub-identifier (sub-ID) to each particular individual instance. Thus the communication system is capable of distinguishing between the different instances whilst still maintaining a consistent identity for the user within the communication system.

User 102 is logged-in at device 104 as "User A". User 112 is logged-in at device 114 as "User B", but need not be logged-in at TV 110. For instance, in a conference room scenario, TV 110 may be logged on (e.g.) as "Company X". As described in more detail below, user 112 has the option of transferring at least a part of an experience from device 114 to TV 110, without having to log-in as "User B" at TV 110 and without having to log-out "Company X" at TV 110.

In alternative embodiment, user 112 is logged-on as (e.g.) "User B" at both device 114 and TV 110 (although, as discussed, this is not required). In these embodiments, an enhanced experience could be offered, (e.g.) with the user 112 able to add other users to a call conducted using TV 110 using techniques which are known in the art.

The TV 110 is connected to the network 106 via a network interface such as a modem. The TV 110 shown in FIG. 1 is a standalone unit, but it should be appreciated that a separate TV and set-top box (STB) or other TV-connected device can also be used.

The TV 110 is executing an embedded communication client 108b (client engine). Note that in alternative embodiments, the embedded communication client can be executed in a STB. The embedded communication client 108b comprises software executed on a local processor in the TV 110.

The TV 110 is arranged to receive information from and output information to the user 112. A remote control unit may act as an input device operated by the user 112 for the control of the TV 110. The TV 110 can also receive broadcast television signals, and display these as video (television programmes) to the user on the TV screen. The broadcast television signals can be delivered by terrestrial, satellite or cable broadcasting, and be in the form of analogue signals or digital data.

Figure 2:
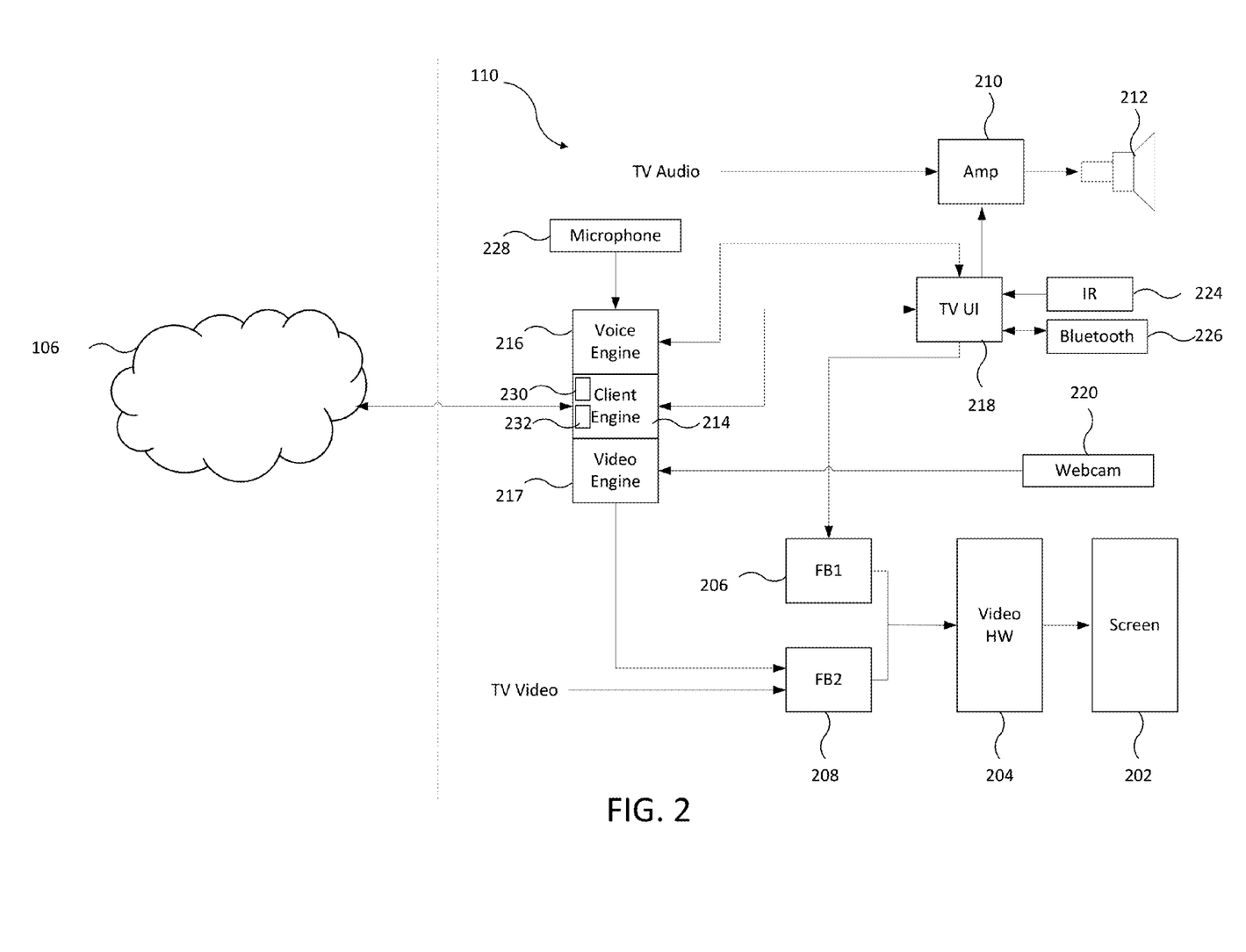
FIG. 2 is a schematic block diagram of a media device.

Reference is now made to FIG. 2, which illustrates the hardware and software functional blocks embedded in the TV 110. The TV 110 comprises a number of output components including a and at least one speaker 212. The screen 202 is for displaying images to the user 112 and is driven by video driver hardware 204 arranged to convert video signals into the form required to be correctly displayed on the screen 202. The video driver hardware 204 is provided with digital video data from two frame buffers 206 and 208. The frame buffers 206 and 208 are storage devices that buffer video data that is to be displayed to the user. Frame buffer 2 ("FB2") 208 receives standard TV video signals, as is known for the display of broadcast TV. Frame buffer 1 ("FB1") 206 stores video data related to the packet-based communication client, as will be described presently. An audio amplifier 210 receives TV audio signals and amplifies these for output through at least one speaker 212.

The TV audio and video input signals themselves originate from television signals broadcast via any suitable means such as a satellite repeater stations, wireless terrestrial repeater stations or cable; and received by a television receiver unit of the TV 100 (not shown). Note that broadcasting is distinct from point-to-point communication, including being distinct from multicasting (i.e. point-to-multipoint). In broadcasting, signals are transmitted indiscriminately, i.e. regardless of whether the user has selected to receive the signal (although a decryption key or such like may still be required so that only authorised users can access the broadcast); whereas in point-to-point communication, signals must be requested by the user or users receiving them. Or put another way, to receive a broadcast a user simply "tunes in" without needing to send any signal to the broadcaster, whereas to establish a point-to-point connection then signals must be exchanged between the user and broadcaster.

The TV receiver unit may comprise for example an antenna, satellite dish or cable input; sampling circuitry; a filter; a low noise amplifier; a mixer, and/or an analogue to digital converter. After being received by the receiver unit, the signals are then processed by a signal processing apparatus (also not shown) before being input to the frame buffers and amplifiers of FIG. 1. Such signal processing is well known to persons skilled in the art and is therefore not discussed in detail herein.

The packet-based communication client embedded in the TV 110 is based around four main elements. These four elements are shown as software elements that are stored in a memory and executed on a processor, although alternatives are envisaged. The four elements are: a client engine 214; an audio engine 216; a video engine 217; and a TV user interface 218.

The client engine 214 is responsible for setting up connections to the packet-based communication system. This is performed via a connection from the TV 110 to the network 106. The TV 110 is connected to the network 106 via a network interface 122 such as a modem, and the connection between the TV 110 and the network interface may be via a cable (wired) connection or a wireless connection. The client engine 214 performs call set-up, authentication, encryption and connection management, as well as other functions relating to the packet-based communication system such as firewall traversal, presence state updating, and contact list management.

The audio engine 216 is responsible for the encoding of voice signals input to the TV 100 via a microphone 228 as VoIP packets for transmission over the network 106 and the decoding of VoIP packets received from the network 106 for presentation as audio information to the user 112 of the TV 110. The microphone 228 may be integrated into the TV 110 or be connected to the TV 110 by way of a wired or wireless connection.

The video engine 217 is responsible for the encoding of video signals input to the TV (e.g. from a webcam 220 or other video camera) as video packets for transmission over the network 106 in a video call, and the decoding of video packets received from the network 106 in a video call for presentation as video images to the user 112 of the TV 110. The webcam 220 may be integrated into the TV 110 or be connected to the TV 110 by way of a wired or wireless connection.

The TV user interface ("UI") 218 is responsible for presenting visual information to the user 112 of the TV 110 in the form of a graphical user interface displayed on the TV screen 202.

The client engine 214 is connected to the TV UI 218 in order to control what the UI displays to the user. The client engine 214 is also closely integrated with the audio engine 216 and video engine 217 for the efficient transmission and receiving of voice and video packets over the network 106.

The video engine 217 is connected to FB2 208 for providing video data to be displayed on the TV screen 202.

The TV UI 218 is connected to FB1 206, so that the graphical user interface data is buffered and ultimately displayed to the user on the screen 202. The TV UI 218 is also connected to the amplifier 210, enabling sound (such as voice signals or notifications) to be produced from the TV speakers 212. The TV UI 218 may also be connected to an infra-red ("IR") receiver 224 and/or a Bluetooth transceiver 126 which are used for communicating with a remote control unit.

Note that if the embedded communication client is provided in the form of a STB (or other TV-connected device) for connection to a TV, then the system in FIG. 1 differs only in that the screen 202, amplifier 210, speaker 212, webcam 220 and microphone 228 blocks are located in the TV itself, whereas the remaining functional blocks are located in the set top box, which is connected to the TV.

Client engine 214 comprises an audio monitoring application 230, which receives inputs from microphone 228, and a video monitoring application 232, which receives inputs from camera 220. Monitoring applications 230, 232 are operable to analyse their respective inputs.

The TV 110 is configured so at to continuously listen to its environment. That is, TV 110 is configured so as to repeatedly capture audio signals using microphone 228 which are input to audio monitoring application 230 for analysis.

The TV 110 is also configured so as to continuously watch its environment. That is, TV 110 is configured so as to repeatedly capture video signals using camera 220 which are input to video monitoring application 232 for analysis.

Figure 3:
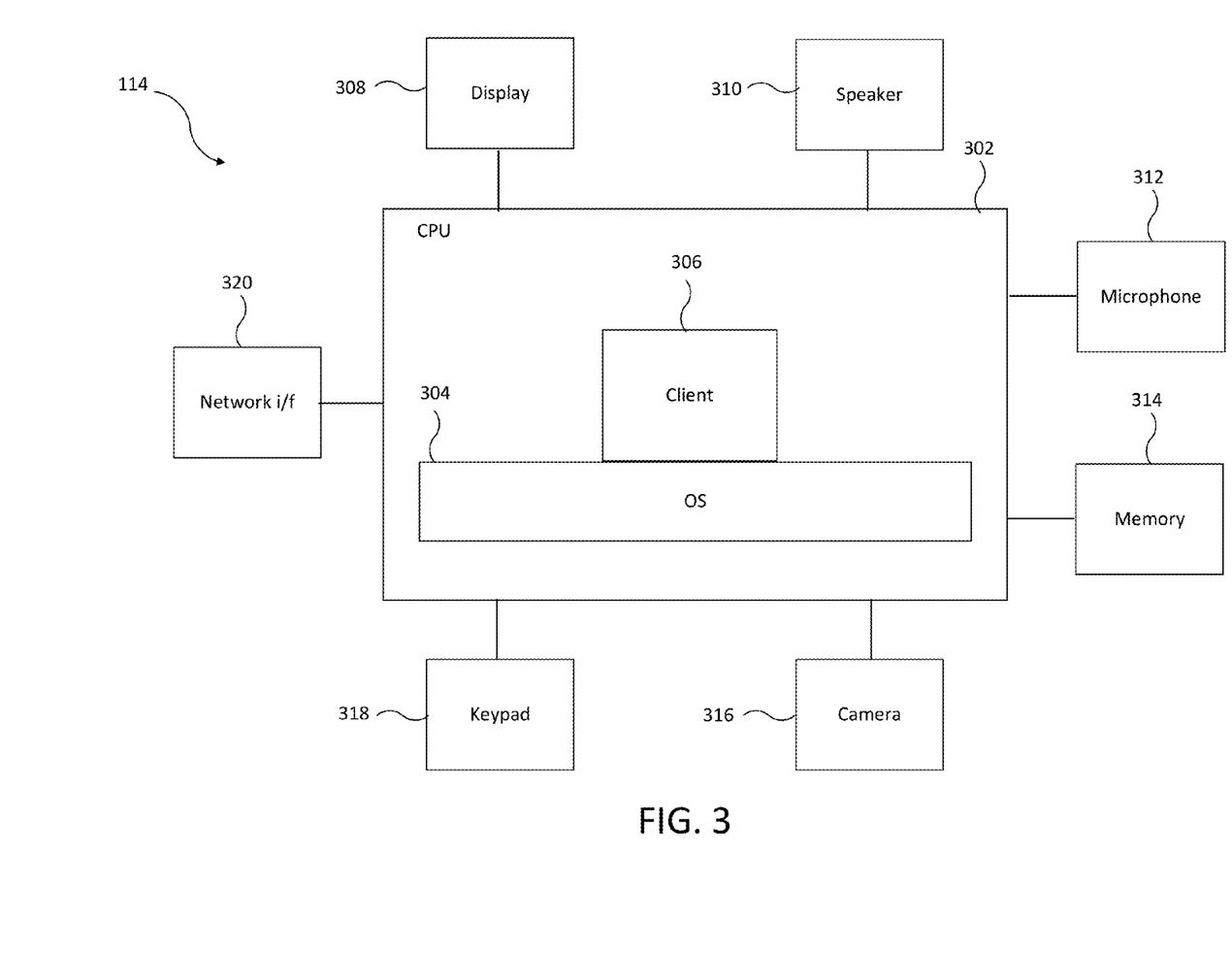
FIG. 3 is a schematic block diagram of a user device.

FIG. 3 illustrates a detailed view of the user device 114 on which is executed a communication client instance 306 for communicating over the communication system 100. The user device 114 comprises a central processing unit ("CPU") or "processing module" 302, to which is connected: output devices such as a display 308, which may be implemented as a touch-screen, and a speaker (or "loudspeaker") 310 for outputting audio signals; input devices such as a microphone 312 for receiving audio signals, a camera 316 for receiving image data, and a keypad 318; a memory 314 for storing data; and a network interface 320 such as a modem for communication with the network 106. The user device 114 may comprise other elements than those shown in FIG. 2. The display 308, speaker 310, microphone 312, memory 314, camera 316, keypad 318 and network interface 320 may be integrated into the user device 104 as shown in FIG. 2. In alternative user devices one or more of the display 308, speaker 310, microphone 312, memory 314, camera 316, keypad 318 and network interface 320 may not be integrated into the user device 114 and may be connected to the CPU 302 via respective interfaces. One example of such an interface is a USB interface. If the connection of the user device 114 to the network 106 via the network interface 320 is a wireless connection then the network interface 320 may include an antenna for wirelessly transmitting signals to the network 106 and wirelessly receiving signals from the network 106.

FIG. 3 also illustrates an operating system ("OS") 304 executed on the CPU 302. Running on top of the OS 304 is the software of the client instance 306 of the communication system 100. The operating system 304 manages the hardware resources of the computer and handles data being transmitted to and from the network 106 via the network interface 320. The client 306 communicates with the operating system 304 and manages the connections over the communication system. The client 306 has a client user interface which is used to present information to the user 112 and to receive information from the user 112. In this way, the client 306 performs the processing required to allow the user 102 to communicate over the communication system 100.

Figure 4:
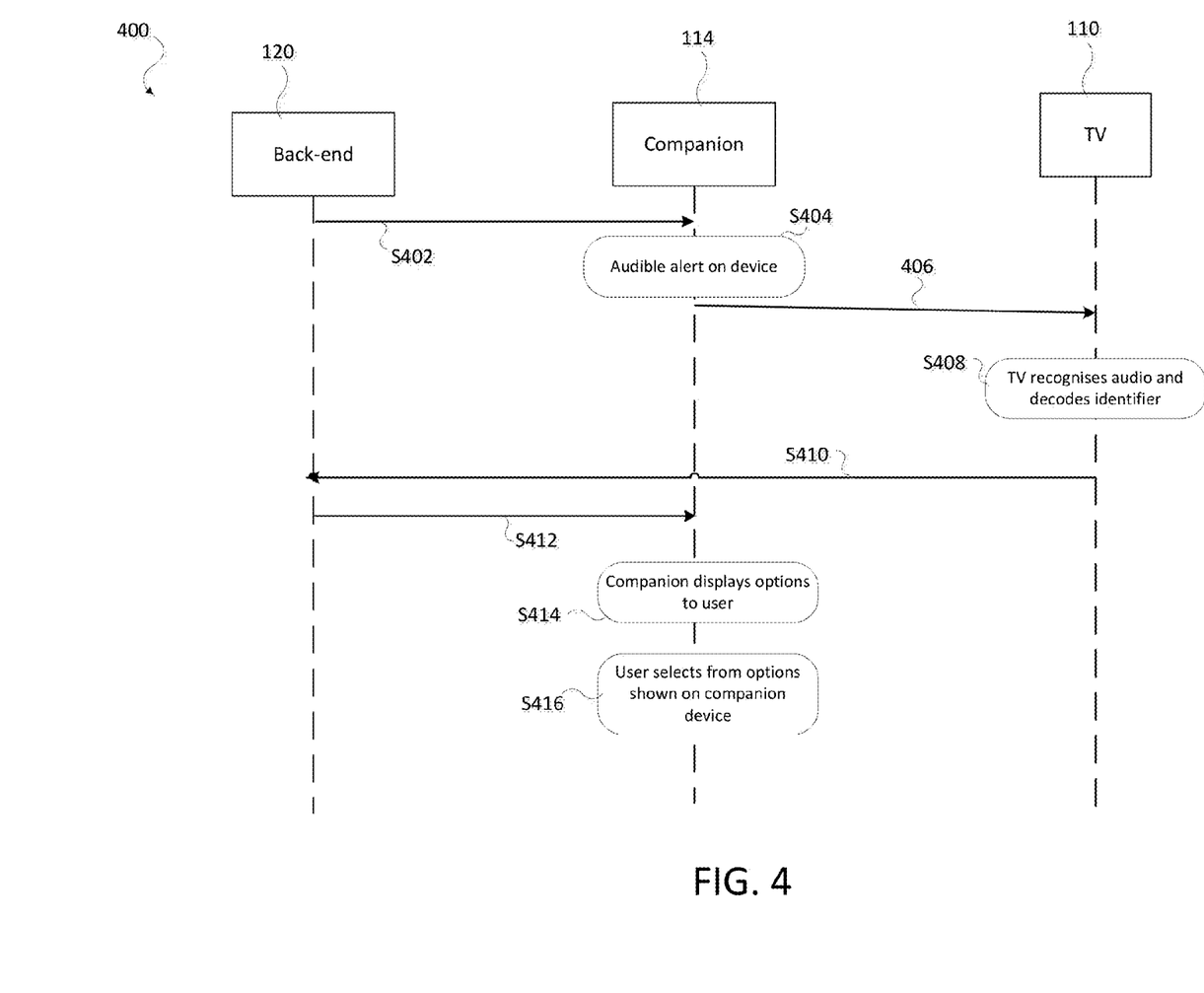
FIG. 4 is a schematic block diagram of a method.

A method 400 will now be described with reference to FIG. 4. The method enables device 114 to act as a companion device to TV 110, without requiring any pre-existing relationship between them i.e. the device 114 and 110 can be "strangers" to one another. Device 114 and TV 110 are temporarily paired (that is, paired mode is initiated at both) as part of the described method.

As discussed, device 114 delivers an experience to user 112 via one or more output components.

At step S402, back end server sends a message to client 108c executed on device 114 comprising a unique identifier. The unique identifier identifies the device 114 within the communication system 100. To this end, back-end server 120 is operable to store the unique identifier in association with a network address of device 114.

Device 114 is configured to receive a notification of an event. At step S404, an event triggers the companion device 114 to output an indication 406 of the event in which the unique identifier is encoded over an air interface. The event may, for example be a communication event such as an incoming voice or video call received at the companion device 114 from user device 104 (in which case the notification is received via network 106 from user device 104 or back-end server 120).

Alternatively, the event may be an input from user 112 (in which case the notification is received via an input means of device 114), in which case user 112 requests an identifier from back-end server 120. That is, responsive to the user input, the client 108c generates and transmits a request for an identifier to server 120 which returns an identifier in response. This is applicable in the case of a screen sharing scenario in which a user goes in a meeting room and wants to share a presentation from (e.g.) their Personal Computer (PC) with a TV/Monitor in the conference room. User 112 selects an option on their PC client that requests an identifier from server 12. The PC transmits (e.g. plays) the indicator and, when the TV/Monitor receives (e.g. hears) the indicator, the option to screenshare is given which the user then selects.

The indication may be in the form of an audio indication (alert) played out via speaker 310 and/or a visual indication displayed via display 308.

The indication is detectable by, and recognizable to, TV 110 such that TV 110 is able to identify and decode the unique identifier encoded in the indication.

In embodiments where the indication is an audio alert 406, played out through speaker 310, the unique identifier is encoded as an inaudible (sonic) watermark. Techniques for encoding and decoding information in the form of inaudible watermarks are known in the art.

This allows user 112 to select (e.g.) a customized ringtone for incoming calls (i.e. which need not be recognizable to TV 110 per se) to be played out on receipt of a call. Before playing out the ringtone as an audio stream in response to an incoming call, client 306 injects the watermark into the audio stream. Thus, the audio alert played out though speaker 312 has both an audible component which serves to inform the user of the incoming call and an inaudible component which serves to communicate the unique identifier to the TV 110.

At step S408, the audio alert is captured by microphone 228 (which, as discussed, is constantly listening to its environment) as an audio signal which is input to, and analysed by, audio monitoring application 230. Monitoring application 320 detects the inaudible watermark and decodes it in order to extract the unique identifier.

At step S410, client 108b executed on TV 110 sends a message to a network node, (back-end server 120 in this embodiment) via network 106. The message indicates to the back-end server that the TV 110 has detected the inaudible watermark. Along with the message, the TV 110 sends the unique identifier itself as well as an indication of its own capability, for instance in the form of a set of device capabilities (which could include an indication of whether it can accept video calls, whether it is capable of screen sharing, screen size among others).

At step S412, back-end server sends a message to client 108c of device 114 over network 106 with details of the TV 100 (including its capabilities). In response thereto, device 114 is operable to display (step S414) selectable options to user 112 for interacting with TV 110 using companion device 114 (via network 106). At step At step S416, user 112 selects from the displayed options which initiates a (temporary) paired mode of device 114 and TV 110 by transferring at least part of the experience to TV 110.

For example, if the event is communication event received at the companion device 114 (such as an incoming voice or video call) from a remote calling user (such as user 102), one of the options displayed on device 114 may be to transfer the communication event to the TV 110 instead (i.e. to answer, or continue, the call at the TV rather than on the device 114). Once the user selects the option to transfer the communication event, the device 114 may send a message to the calling user comprising a network address of TV 110 so that a network connection can be established between the calling user and the TV 110, thereby allowing the call to be transferred to the TV. That is, such that the call can be transferred from "User B", logged-in at companion device 114, to "Company X", logged-in at TV 110.

The call may be transferred to TV 110 before it is established (e.g. during a "ringing" period) and then established at TV 110. Alternatively, the call may be first established at device 114 and then transferred later (i.e. during the call).

Another example would be an option to instigate screen sharing between the companion device 114 (logged-in as "User B") and the TV 110 (logged-in as "Company X") i.e. to allow a current image displayed on display 308 of device 114 to be communicated to TV 110 via network 106 for display on screen 202.

The user identifier may form part of a communication event received at device 114. For instance, in the case of an incoming call, the unique identifier is communicated to device 144 along with the call.

Alternatively or additionally, the user may be able to select an option to purposively generate an audio alert in order to establish a connection with TV 110 (e.g. for screen-sharing between companion device 114 and TV 110), in which case the device 114 requests a temporary identifier from back-end server 120 to be encoded as an inaudible watermark.

It is envisaged that only a part of the experience is transferred to the TV 110, with the device 114 delivering the remainder of the experience. For instance, device 114 may have established both a video call with user 102 and screen-sharing with user 102 via network 106. User 112 may elect to transfer the screen-sharing to TV 110, such that user 112 can continue the video call using device 114 and view an image of device 104's display on the TV 110.

Another scenario in which only part of an experience is transferred to TV 110 is a screen sharing scenario between device 114 and TV 110. In this instance, a standalone experience is initially delivered to user 112 which involves displaying an image on display 308. In establishing screen sharing as described above, part of that experience is transferred to, and delivered by, TV 110 (which involves displaying the same image on screen 202) with device 112 delivering the remainder of the experience (as it also continues to display the same image on screen 308).

It is also envisaged that whole experiences could be transferred from device 114 to TV 110, e.g. if a communication event is transferred to TV 110 from device 114 and then conducted using only TV 110 (and not device 114).

As will be appreciated, there is no requirement for device 114 and TV 110 to be "paired" in any traditional sense (such as Bluetooth pairing), as the method allows for temporary pairing via the exchange of identifiers. Device 114 and TV 110 can therefore be unknown to one another. The only direct communication between device 114 and TV 110 is via the exchange of audio signals. This does not require any form of authentication (such as generating shared secrets, log-in etc.), thereby allowing "stranger" devices to establish a companion relationship quickly and efficiently, with minimal user input required. Thereafter, any further communication takes place via network 106.

The unique identifier may be temporary in the sense that, subsequent to the call, screen-sharing etc., the identifier may be disassociated from device 114 such that it can no longer be used to establish a connection with device 114. This may be desirable (e.g.) in a conference room setting in which a visiting user may wish to instigate screen sharing between a tablet device and a conference room TV temporarily (via network 106), but has no desire to establish a permanent relationship therewith.

In alternative embodiments, an event may trigger a visual indication such as a Quick Response (QR) code to be displayed on display 308 of device 144, instead of or in addition to an audio alert, with the unique identifier encoded in the QR code. Techniques for achieving this are known in the art. Providing the display 308 is visible to camera 220, the TV 110 will capture image data of the visual indication (as discussed, TV 110 is constantly watching its environment) and decode the identifier in the visual indication. For instance, in embodiments where device 114 is a smart phone, user 112 can direct the display 308 towards camera 220. Video monitoring application 232 then analyses the captured image data, detects the visual indication, and determines that the event has occurred. Thereafter, the method proceeds as described above (from S410 onwards).

Generally, any of the functions described herein (e.g. the functional modules shown in FIGS. 2 and 3, and the functional steps shown in FIG. 4) can be implemented using software, firmware, hardware (e.g., fixed logic circuitry), or a combination of these implementations. The modules and steps shown separately in FIGS. 2 and 3 may or may not be implemented as separate modules or steps. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described herein are platform-independent, meaning that the techniques may be implemented on a variety of commercial computing platforms having a variety of processors. For example, the user devices may also include an entity (e.g. software) that causes hardware of the user devices to perform operations, e.g., processors functional blocks, and so on. For example, the user devices may include a computer-readable medium that may be configured to maintain instructions that cause the user devices, and more particularly the operating system and associated hardware of the user devices to perform operations. Thus, the instructions function to configure the operating system and associated hardware to perform the operations and in this way result in transformation of the operating system and associated hardware to perform functions. The instructions may be provided by the computer-readable medium to the user devices through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In particular, whist the embodiments described above have been described with reference to a TV with an embedded communication client, it should be understood that the client can also be embedded into another type of media device for connection to a TV, such a set top box, a games console or video playback device (e.g. a video disc player or a personal video recorder).

Further, whilst the embodiments described above have been described with references to particular experiences delivered by a communication client, it will be appreciated that typical user device are operable to execute versions of many different applications or "apps", each of which can deliver a particular experience appropriate to that device. Similarly, typical media devices are also operable to execute (potentially different) versions of those applications or "apps" which offer alternative experiences. It will be appreciated that the claimed subject matter is broadly applicable to all such experiences, both allowing transfer of an entire experience delivered by a user device to a media device such that the experience is offered by the media device in its entirety in the form of an alternative experience thereafter, and allowing partial transfer of an experience from a user device to a media device such that part of the experience is delivered by the media device and the remainder of the experience is delivered by the user device thereafter, with the user device and media device acting in conjunction to deliver the experience as a whole.

The invention claimed is:

1. A user device comprising:
    an output component configured to deliver an experience to a user in a standalone mode of the user device;
    an input component configured to receive a notification of an event;

an indication generator for generating an indication played out over a speaker of the user device in response to receiving said input, said indication comprising an identifier relating to the event, the indication being effective to enable a media device to pair with the user device for the identified event; and a processing component configured to:
receive a message from a network node via a network, said message indicating that the media device has detected said identifier, and comprising information of the media device;
process said message received from the network node and provide a selectable option to a user of the user device via the output component, said selectable option provided in dependence on said information of the media device; and
detect selection of the option by the user and to initiate a paired mode of the user device by transferring at least part of the experience to the media device.

2. A user device according to claim 1, wherein the output component comprises a display.

3. A user device according to claim 1, wherein the indication is generated as an audio indication.

4. A media device according to claim 3, wherein the identifier comprises a sonic watermark.

5. A user device according to claim 1, wherein the output component is configured to output the indication as a visual indication.

6. A media device according to claim 5, wherein the identifier comprises a Quick Response code.

7. A user device according to claim 1, wherein the event is a communication event received from the network node via the network.

8. A user device according to claim 7, wherein the identifier is received in said communication event.

9. A user device according to claim 1, wherein the event is an input from the user of the user device.

10. A user device according to claim 9, wherein the indication generator requests, from the network node, said identifier for insertion into said indication in response to receiving said event.

11. A user device according to claim 1, wherein the processing component is configured to execute a communication client to establish a communication event with a second user device via a network.

12. A user device according to claim 11, wherein the processing component is configured to transfer the communication event to the media device based on the detected selection of the option by the user.

13. A user device according to claim 11, wherein the output component comprises a display and the processing component is configured to transfer image data displayed on said display to the media device via the network.

14. A user device according to claim 1, wherein said information of the media device comprises information pertaining to capabilities of the media device.

15. A user device according to claim 1, wherein said at least part of the experience is transferred to the media device via the network when the user device is operating in said paired mode.

16. A media device comprising:
a detection component configured to directly detect an indication of an identifier of an event output from a speaker of a user device, said identifier relating to an event at the user device, the indication being effective to enable the media device to pair with the user device for the identified event;

a processing component configured to decode the identifier in said indication; transmit a message to a network node via a network, the message indicating the presence of the media device to the network node; and receive a transfer of at least part of an experience configured to be delivered at the user device when the user device operates in a standalone mode, at the media device; and
an output component configured to deliver said at least part of the experience to a user of the media device.

17. A media device according to claim 16, wherein the detection component comprises a microphone for detecting an audio indication.

18. A media device according to claim 17, wherein the identifier comprises a sonic watermark.

19. A media device according to claim 16, wherein the detection component further comprises a camera to detect a visual indication that includes the identifier.

20. A method of transferring at least part of an experience configured to be delivered at a user device when the user device operates in a standalone mode, to a media device, method comprising:
at the media device, directly detecting an indication of an identifier of an event output from a speaker of the user device, said identifier relating to an event, the indication being effective to enable the media device to pair with the user device for the identified event;
decoding the identifier in said indication;
transmitting a message to a network node via a network, the message indicating the presence of the media device to the network node and comprising the decoded identifier and information pertaining to capabilities of the media device;
receiving a transfer of said at least part of an experience, at the media device; and
delivering said at least part of the experience to a user of the media device via an output component of the media device.

21. A method according to claim 20, wherein the output component comprises a display.

22. A method according to claim 20, wherein the indication is generated as an audio indication.

23. A method according to claim 22, wherein the identifier comprises a sonic watermark.

24. A method according to claim 20, wherein the user device is configured to output the indication as a visual indication.

25. A method according to claim 24, wherein the identifier comprises a Quick Response code.

26. A method according to claim 20, wherein the event is a communication event received from the network node via the network.

27. A method according to claim 26, wherein the identifier is received in said communication event.

28. A method according to claim 20, wherein the event is an input from the user of the user device.

29. A method according to claim 28, wherein the user device requests, from the network node, said identifier for insertion into said indication in response to receiving said event.

30. A method according to claim 20, wherein the user device is configured to execute a communication client to establish a communication event with a second user device via the network.

31. A method according to claim 30, wherein the user device is configured to display a selectable option based on said information of the media device and the user device is configured to transfer the communication event to the media device based on detecting selection of the option by the user.

32. A method according to claim 30, wherein the user device comprises a display and the user device is configured to transfer image data displayed on said display to the media device via the network.

* * * * *